(12) United States Patent
Pandita

(10) Patent No.: US 12,355,596 B2
(45) Date of Patent: Jul. 8, 2025

(54) ADAPTIVE CHANNEL EQUALIZATION FOR A DUO-BINARY TRANSCEIVER

(71) Applicant: Microsoft Technology Licensing, LLC, Redmond, WA (US)

(72) Inventor: Bupesh Pandita, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 18/189,864

(22) Filed: Mar. 24, 2023

(65) Prior Publication Data

US 2024/0333563 A1 Oct. 3, 2024

(51) Int. Cl.
*H04L 25/06* (2006.01)
*H04B 1/38* (2015.01)

(52) U.S. Cl.
CPC ............ *H04L 25/062* (2013.01); *H04B 1/38* (2013.01)

(58) Field of Classification Search
CPC ............... H04L 25/062; H04L 25/0272; H04L 2025/03808; H04L 25/03076; H04L 25/4904; H04L 25/497; H04L 25/03343; H04B 1/38
USPC ........................................................ 375/262
See application file for complete search history.

(56) References Cited

U.S. PATENT DOCUMENTS

2005/0002475 A1 1/2005 Menolfi
2009/0296793 A1* 12/2009 Lee ..................... H04L 25/49
375/295

OTHER PUBLICATIONS

International Search Report and Written Opinion received for PCT Application No. PCT/US2024/019317, Jun. 27, 2024, 16 pages.
Michiel et al., "Adaptive Transmit-Side Equalization for Serial Electrical Interconnects at 100 GB/s Using Duobinary", IEEE Transactions on Circuits and Systems I: Regular Papers, IEEE, US, vol. 64, No. 7, Jul. 1, 2017, pp. 1865-1876.
Park, et al., "A 21Gb/s Duobinary Transceiver for GDDR Interfaces with an Adaptive Equalizer", 2021 IEEE Asian Solid-State Circuits Conference (A-SSCC), IEEE, Nov. 7, 2021, pp. 1-3.

* cited by examiner

*Primary Examiner* — Fitwi Y Hailegiorgis
(74) *Attorney, Agent, or Firm* — Ranjeev Singh; Singh Law, PLLC

(57) ABSTRACT

Systems and methods related for duo-binary transceivers with adaptive channel equalization are described. An example method for adapting a channel between a first duo-binary transceiver and a second duo-binary transceiver, different from the first duo-binary transceiver, where the transmitter includes a feed-forward equalizer (FFE), is described. The method includes, at a receiver associated with the second duo-binary transceiver, selectively processing information at a given time from only an upper eye or a lower eye of a received duo-binary signal to determine updated coefficients for the feed-forward equalizer (FFE) of the transmitter associated with the first duo-binary transceiver. The method further includes using a backchannel between the transmitter and the receiver, sending the updated coefficients to the transmitter. The method further includes transmitting duo-binary signals that are equalized using the updated coefficients for the FFE of the transmitter associated with the first duo-binary transceiver.

22 Claims, 11 Drawing Sheets

900

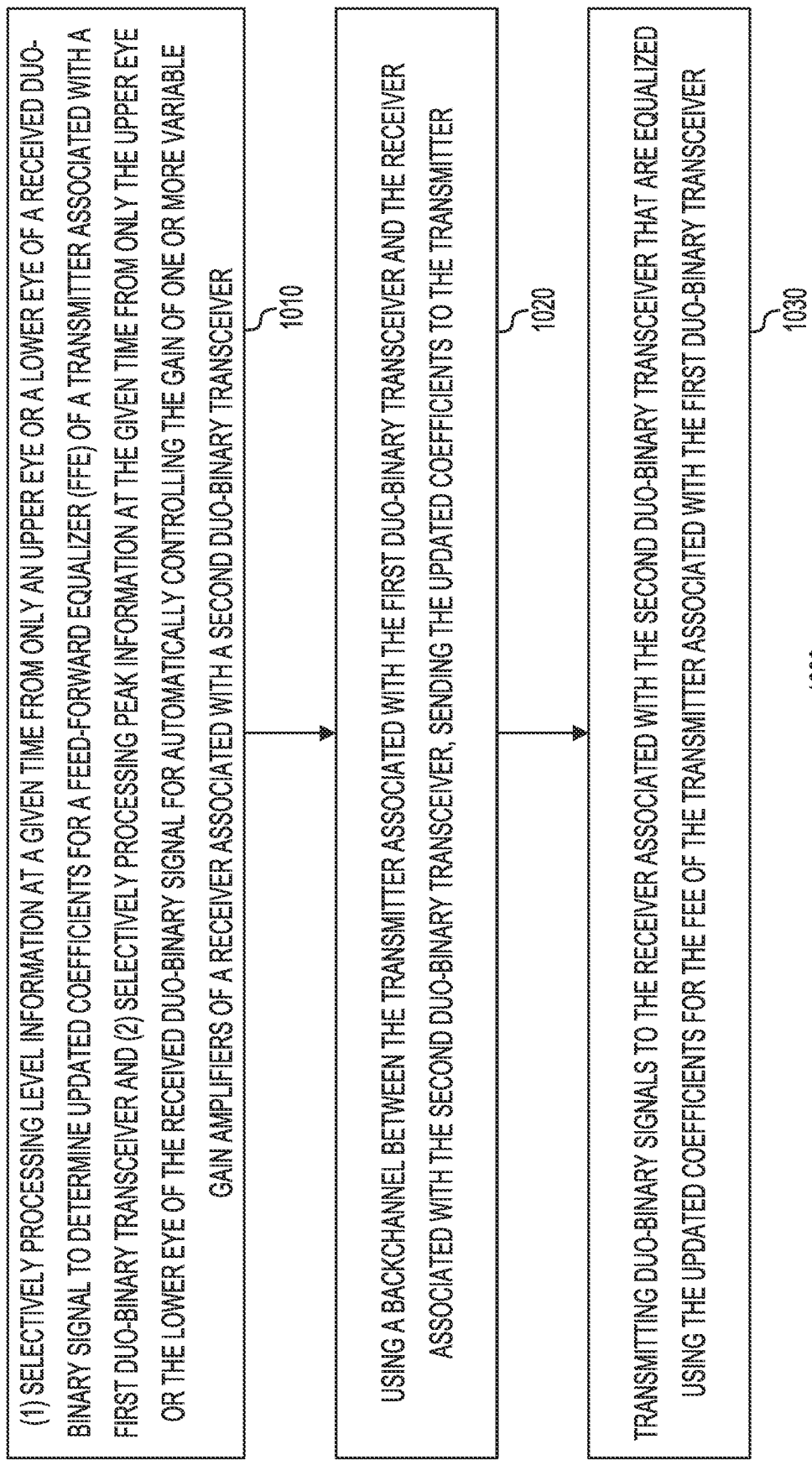

ADAPTIVE CHANNEL EQUALIZATION FOR A DUO-BINARY TRANSCEIVER

BACKGROUND

Many systems require high data rate communication between components associated with such systems. Such high data rate communication is enabled by transceivers that use various multi-level modulation schemes, including duo-binary modulation, three-level pulse amplitude (PAM3) modulation, or four-level pulse amplitude (PAM4) modulation. Such multi-level modulation schemes are preferred since they typically require a lower Nyquist frequency of the data signal than the Nyquist frequency for the non-return to zero (NRZ) data signals. Each of these multi-level modulation schemes pose various challenges depending on the context of use for such modulation schemes.

Duo-binary modulation scheme-based transceivers are promising candidates for use in systems requiring high data rate communication because while duo-binary modulation offers similar spectral efficiency as PAM4 modulation, duo-binary modulation requires only three signal levels instead of the four signal levels required by PAM4 modulation. Moreover, duo-binary modulation is less sensitive to crosstalk than the PAM3 modulation.

Even though a duo-binary modulation scheme may be better in certain scenarios, high data rate communication including the use of high frequency signals suffers from inter-symbol interference (ISI) caused, among other things, by the frequency-dependent channel attenuation. While previous approaches have used transmitters with feed-forward equalization (FFE) to address such ISI, there remains a need for improved systems and methods for addressing these issues in the context of high data rate communication systems.

SUMMARY

In one example, the present disclosure relates to a method for adapting a channel between a first duo-binary transceiver and a second duo-binary transceiver, different from the first duo-binary transceiver, where the transmitter includes a feed-forward equalizer (FFE). The method may include at a receiver associated with the second duo-binary transceiver, selectively processing information at a given time from only an upper eye or a lower eye of a received duo-binary signal to determine updated coefficients for the FFE of the transmitter associated with the first duo-binary transceiver.

The method may further include using a backchannel between the transmitter associated with the first duo-binary transceiver and the receiver associated with the second duo-binary transceiver, sending the updated coefficients to the transmitter associated with the first duo-binary transceiver. The method may further include transmitting duo-binary signals to the receiver associated with the second duo-binary transceiver that are equalized using the updated coefficients for the FFE of the transmitter associated with the first duo-binary transceiver.

In another example, the present disclosure relates to a system for adapting a channel between a first duo-binary transceiver and a second duo-binary transceiver, different from the first duo-binary transceiver, where the transmitter includes a feed-forward equalizer (FFE). The system may further include logic to selectively process information at a given time information from only an upper eye or a lower eye of a received duo-binary signal to determine updated coefficients for the FFE of the transmitter associated with the first duo-binary transceiver.

The system may further include a backchannel between the transmitter associated with the first duo-binary transceiver and the receiver associated with the second duo-binary transceiver for sending the updated coefficients to the transmitter associated with the first duo-binary transceiver, such that the transmitter is operable to transmit duo-binary signals, equalized using the updated coefficients for the FFE of the transmitter, to the receiver associated with the second duo-binary transceiver.

In yet another example, the present disclosure relates to a method for adapting a transmitter associated with a first duo-binary transceiver and a channel between the first duo-binary transceiver and a second duo-binary transceiver, different from the first duo-binary transceiver, where the transmitter includes a feed-forward equalizer (FFE). The method may include at a receiver associated with the second duo-binary transceiver: (1) selectively processing level information at a given time from only an upper eye or a lower eye of a received duo-binary signal to determine updated coefficients for the FFE of the transmitter, and (2) selectively processing peak information at the given time from only the upper eye or the lower eye of the received duo-binary for automatically controlling the gain of one or more variable gain amplifiers of the receiver.

The method may further include using a backchannel between the transmitter associated with the first duo-binary transceiver and the receiver associated with the second duo-binary transceiver, sending the updated coefficients to the transmitter associated with the first duo-binary transceiver. The method may further include transmitting duo-binary signals to the receiver associated with the second duo-binary transceiver that are equalized using the updated coefficients for the FFE of the transmitter associated with the first duo-binary transceiver.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 10 shows another flow chart of an example method for implementing adaptive channel equalization as part of a duo-binary transceiver.

DETAILED DESCRIPTION

Examples described in this disclosure relate to systems and methods for duo-binary transceivers with adaptive channel equalization. Certain systems and methods relate to adapting a channel between a first duo-binary transceiver and a second duo-binary transceiver, different from the first duo-binary transceiver, where the transmitter includes a feed-forward equalizer (FFE). Certain examples of the present disclosure also relate to a transceiver architecture for implementing a duo-binary channel that includes a digital solution for adapting the channel to minimize inter-symbol interference (ISI) at the receiver. As described further below, in one example, a transmitter of the duo-binary transceiver features feed-forward equalization (FFE) at the transmitter. A backchannel between the transmitter and the receiver allows the receiver to adapt the coefficients associated with the feed-forward equalizer (FFE) at the transmitting end. An example receiver features a duo-binary equalized eye with two thresholds to recover data from the upper and lower eyes, and a slicer with thresholds to measure the heights of the upper and lower eyes. Another slicer with two thresholds is used to provide edge information. This receiver configuration provides recovered data information to the clock data recovery (CDR) circuit. The receiver configuration further uses the level information to provide FFE coefficient information to the transmitter using the backchannel. In this example, the equalization uses a sign-sign least mean squares (SS-LMS) algorithm to processes the level information to extract the correlation between the present data and previous or post data symbols. This correlation provides the change required at the transmitter for the pre-cursor and post-cursor coefficients. The equalization solution uses the transmitter FFE and the channel inter-symbol interference (ISI) together to create a $1+Z^{-1}$ filter response at the receiver.

Figure 1:
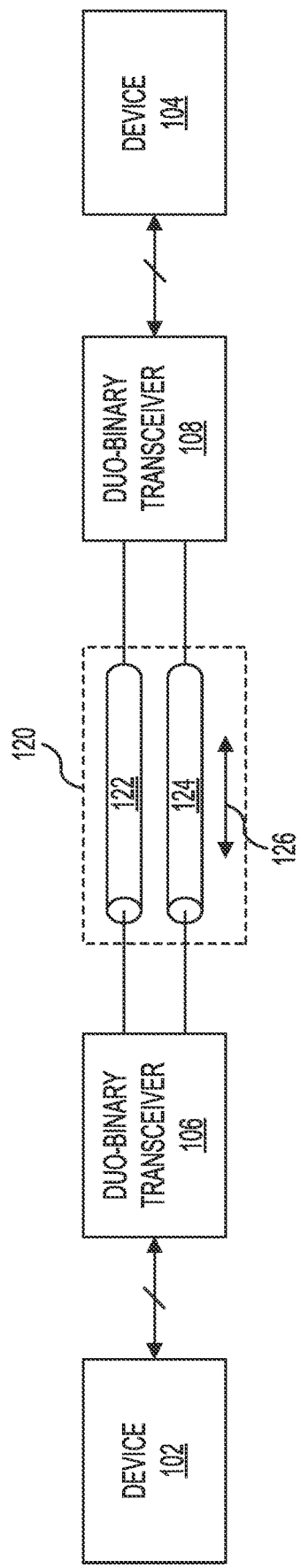
FIG. 1 is a block diagram of an example system including duo-binary transceivers configured to transmit and receive data over a channel.

FIG. 1 is a block diagram of an example system 100 including duo-binary transceivers configured to transmit and receive data over a channel. System 100 includes device 102, device 104, duo-binary transceiver 106, and duo-binary transceiver 108. In this example, device 102 is coupled to duo-binary transceiver 106 and device 104 is coupled to duo-binary transceiver 108. Each of device 102 and device 104 may include components to enable one or more of a storage functionality, a compute functionality, or a networking functionality. In some cases, each of device 102 and device 104 may combine one or more of such functionalities. Duo-binary transceiver 106 may communicate with duo-binary transceiver 108 via a transmission medium 120. Transmission medium 120 may be an optical transmission medium, an electrical transmission medium, an electro-optical transmission medium, or the like. As an example, transmission medium 120 may include a channel comprising of bidirectional links 122 and 124 allowing for the exchange of signals between duo-binary transceiver 106 and duo-binary transceiver 108. Such bidirectional links 122 and 124 may be implemented using electrical conductors, such as copper, or using optical materials, such as optical fibers. In addition, transmission medium 120 may further include a backchannel 126, allowing each duo-binary transceiver to provide feedback related to adaptive channel equalization.

Duo-binary transceiver 106 may also be included in an interface card for use with any device that requires communication over a high data rate channel. Example interface cards include interface cards that conform with one or more of the specifications for high-speed interface cards. As an example, the interface card may be compliant with one or more versions of Peripheral Component Internet Express (PCIe) specification. Other interface cards compliant with other specifications may also include one or more duo-binary transceivers. Although FIG. 1 shows system 100 as including a certain number of components arranged in a certain way, system 100 may include fewer or additional components arranged differently. As an example, device 102 may be integrated with duo-binary transceiver 106 as part of a single system-on-chip (SoC) or another such type of arrangement. Duo-binary transceiver 106 may also be implemented as part of controllers, such as a memory controller (e.g., any type of dynamic-data rate (DDR) controller), a network controller, or a bus-controller.

Duo-binary modulation shapes the spectrum of the data stream by confining it to lower frequencies. Instead of $1+Z^{-1}$ transfer function at the transmitter, the proposed duo-binary scheme uses the channel inter-symbol interference (ISI) to create the duo-binary response at the receiver. An adaptation engine measures the ISI at the receiver and adjusts the equalization at the transmitter to create the duo-binary response. This type of adaptation, with the receiver and the transmitter working together, reduces the demands on the continuous time linear equalizer (CTLE) at the receiver. The adaptation engine can process one eye, upper or lower, at a time and provide the feed-forward equalization (FFE) coefficient information to the transmitter. Before adaptation, the duo-binary upper eye or the lower eye is mapped to a non-return to zero (NRZ) eye. A sign-sign least mean squares (SS-LMS) algorithm processes the NRZ eye, data information, and the level information, to extract the correlation between the present data and previous or post data symbols. This correlation provides the change required at the transmitter for the pre-cursor and post-cursor coefficients.

A duo-binary link implemented as a $1+Z^{-1}$ filter at the transmitter is unable to use the channel ISI and puts the burden of channel equalization on the receiver. The proposed examples described herein use the transmitter FFE and the channel ISI together to create a $1+Z^{-1}$ filter response. This solution reduces the equalization requirements at the receiver. Instead of a $1+Z^{-1}$ filter followed by the FFE, the transmitter combines the two filters into a single FFE filter, and uses the receiver provided information to adapt the FFE filter. The significance of this design is that it takes the complexity out of the receiver where implementing equalization using analog circuits results in higher power consumption. Instead, the equalization adaptation is moved to the transmitter where equalization is implemented in a digital domain. This advantageously results in both lower power consumption and savings in terms of the area occupied by the duo-binary transceiver as part of an integrated circuit.

Figure 2A:
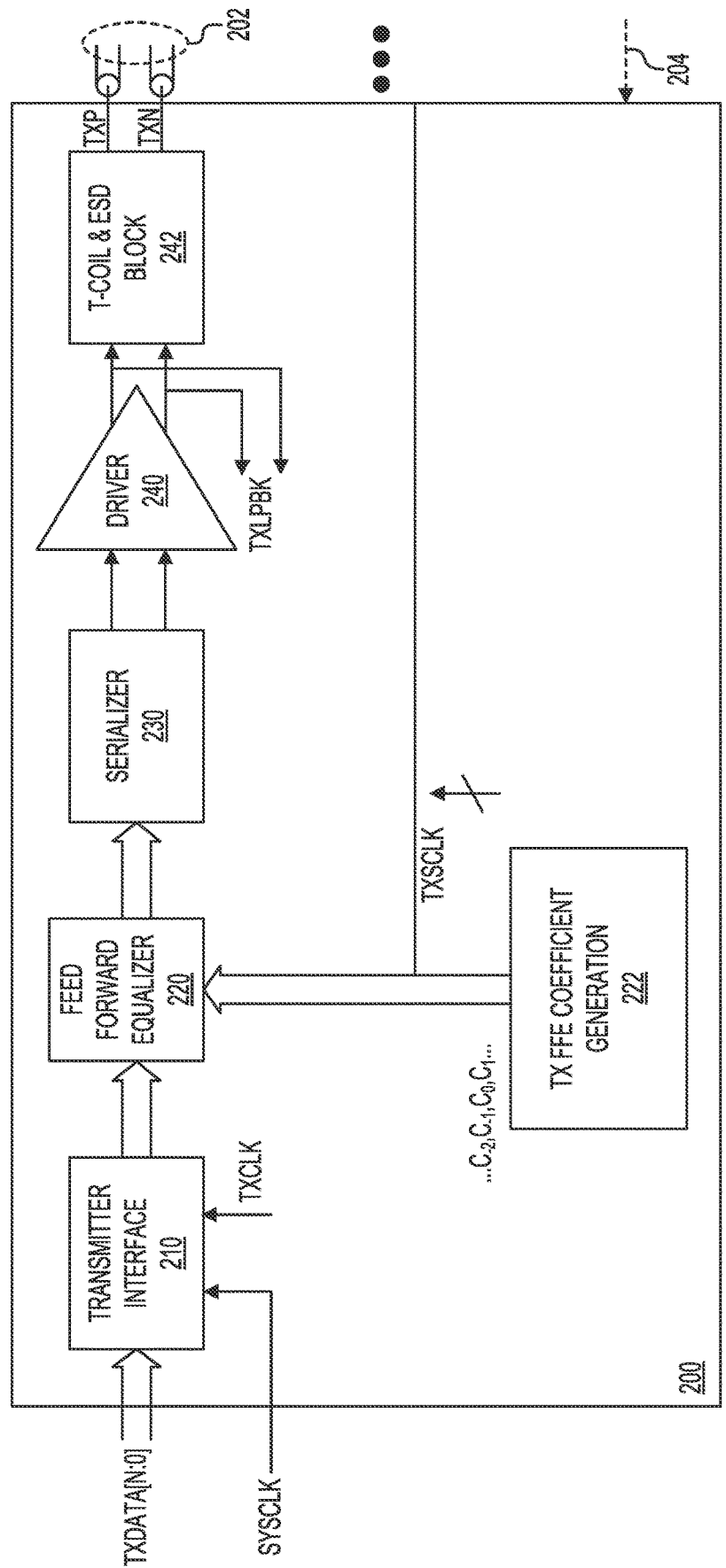
FIGS. 2A and 2B show a block diagram, respectively, of an example transmitter and an example receiver for use with the duo-binary transceivers of FIG. 1.
Figure 2B:
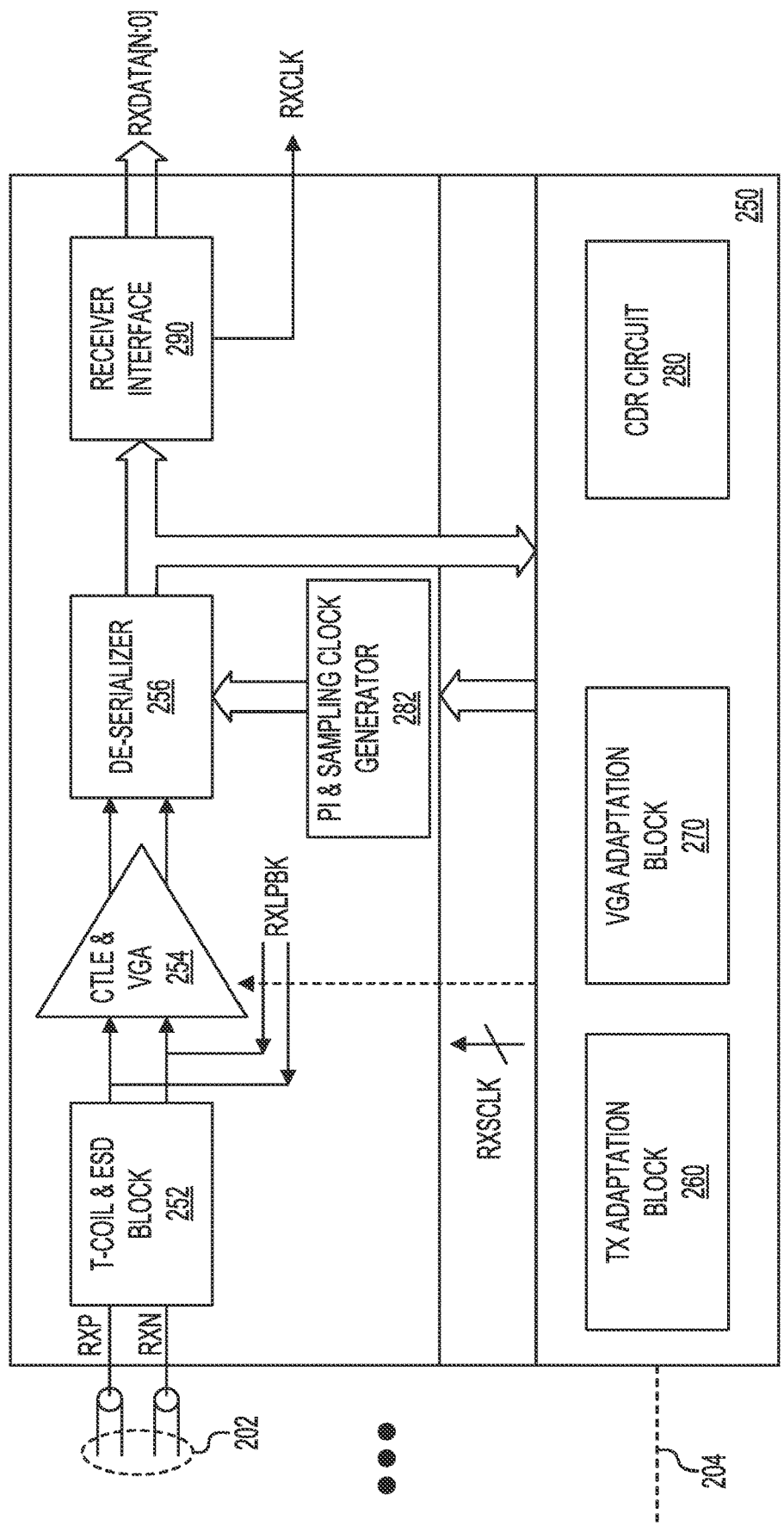

FIGS. 2A and 2B show a block diagram, respectively, of an example transmitter 200 (e.g., associated with duo-binary transceiver 106 of FIG. 1) and an example receiver 250 (e.g., associated with duo-binary transceiver 108 of FIG. 1). Each duo-binary transceiver includes both a transmitter and a receiver allowing the bidirectional transfer of data signals and other signals. Transmitter 200 is configured to transmit signals over a transmission medium (e.g., transmission medium 120 of FIG. 1). Transmitter 200 is coupled to terminals labeled as TXP and TXN, which are coupled via a channel 202 to terminals labeled as TXP and TXN associated with receiver 250. In this example, channel 202 is the example transmission medium for the exchange of data signals between transmitter 200 and receiver 250. Channel 202 is configured for transmission of differential signals that are modulated as duo-binary signals. In addition, a back-channel 204 is provided between transmitter 200 and receiver 250 to allow for adaptive feedback from receiver 250 to transmitter 200.

With continued reference to FIG. 2A, data for transmission (labeled as TXDATA[N:0]) is received by transmitter 200 from a device (e.g., device 102 of FIG. 1) via the transmitter interface 210. This example shows N bits of data that is being received in parallel via the transmitter interface. The transmitter interface 210 may receive both a system clock (labeled as SYSCLK) and a transmitter clock (labeled as TXCLK).

Transmitter 200 further includes a feedforward equalizer (FFE) 220. FFE 220 includes circuitry to apply tap coefficients in order to convert the non-return to zero (1-bit/unit interval (UI)) data into duo-binary data. The tap coefficients are generated by transmitter FFE coefficient generator 222. The example FFE has taps for two pre-cursors, the main cursor, and two post-cursors. The conversion of the NRZ data into the duo-binary signal results in a tri-level signal including two eyes stacked on top of each other.

Still referring to FIG. 2A, transmitter 200 further includes a serializer 230 that is coupled to receive the output of FFE 220. Serializer 230 is configured to convert the parallel data streams received from FFE 220 into a serial data stream. The output of serializer 230 is provided to a driver 240, which in turn is coupled to a T-COIL & ESD block 242. Driver 240 is also configured to provide a clock that is divided into a quarter-rate and transmitted to receiver 250 along with the serialized data stream. Driver 240 is further configured to provided transmitter loopback signals (TXLPBK), which includes management and control information. T-COIL & ESD block 242 includes inductors for impedance matching with the channel 202. In addition, T-COIL & ESD block 242 includes electrostatic discharge circuits, including diodes, that provide electrostatic discharge protection. T-COIL & ESD block 242 are coupled via terminals TXP and TXN to channel 202. Although FIG. 2A shows transmitter 200 as including a certain number of components arranged and coupled in a certain way, transmitter 200 may include fewer or additional components arranged and coupled differently. Although FIG. 2A shows a clock forwarding serial link, the serial link may also be implemented using clock-embedding.

FIG. 2B is a block diagram of an example receiver 250 associated with a duo-binary transceiver (e.g., duo-binary transceiver 108 of FIG. 1) with adaptive channel equalization. Each duo-binary transceiver includes both a transmitter and receiver allowing bidirectional transfer of data signals and other signals. Receiver 250 may receive duo-binary data from channel 202 through terminals labeled as RXP and RXN into a T-COIL & ESD block 252. T-COIL & ESD block 252 includes inductors for impedance matching with the channel 202. In addition, T-COIL & ESD block 252 includes electrostatic discharge circuits, including diodes, that provide electrostatic discharge protection. The output of the T-COIL & ESD block 252 to a continuous time linear equalizer (CTLE) & variable gain amplifier (VGA) 254. The CTLE is a linear filter that is configured to attenuate low-frequency signals, amplify high-frequency signals, and compensate for some of the channel-losses. One or more of the VGAs are configured to amplify the signals output by the CTLE. Each of the one or more VGAs can provide a variable amount of gain to the signals. As explained later, an automatic gain controller (AGC) can be used to vary the gain of the VGAs. The AGC can be included as part of the VGA adaptation block 270. Control and management information is provided to CTLE & VGA 254 via the receiver loopback signals (RXLPBK).

With continued reference to FIG. 2B, the output of CTLE & VGA 254 is provided to a de-serializer 256. The de-serialized data is provided as parallel data (RXDATA[N:0]) via the receiver interface 290. The receiver clock (RXCLK) is also output via the receiver interface 290. Receiver 250 further includes a clock data recovery (CDR) circuit 280, which includes a phase detector and a phase interpolator. CDR circuit 280 receives the digital data from the slicers and extracts the clock signal from the received signal. Another slicer with two thresholds may be used to provide edge information to the CDR circuit. The CDR circuit uses the edge information to align the clock phase. That clock signal is provided to a phase interpolation (PI) & sampling clock generator 282, which provides the phase interpolation and clock signals to the slicers and the de-serializer 256. Although FIG. 2B shows receiver 250 as including a certain number of components arranged and coupled in a certain way, receiver 250 may include fewer or additional components arranged and coupled differently. As an example, receiver 250 may include additional filters, equalizers, or other components not shown in FIG. 2B.

Figure 3:
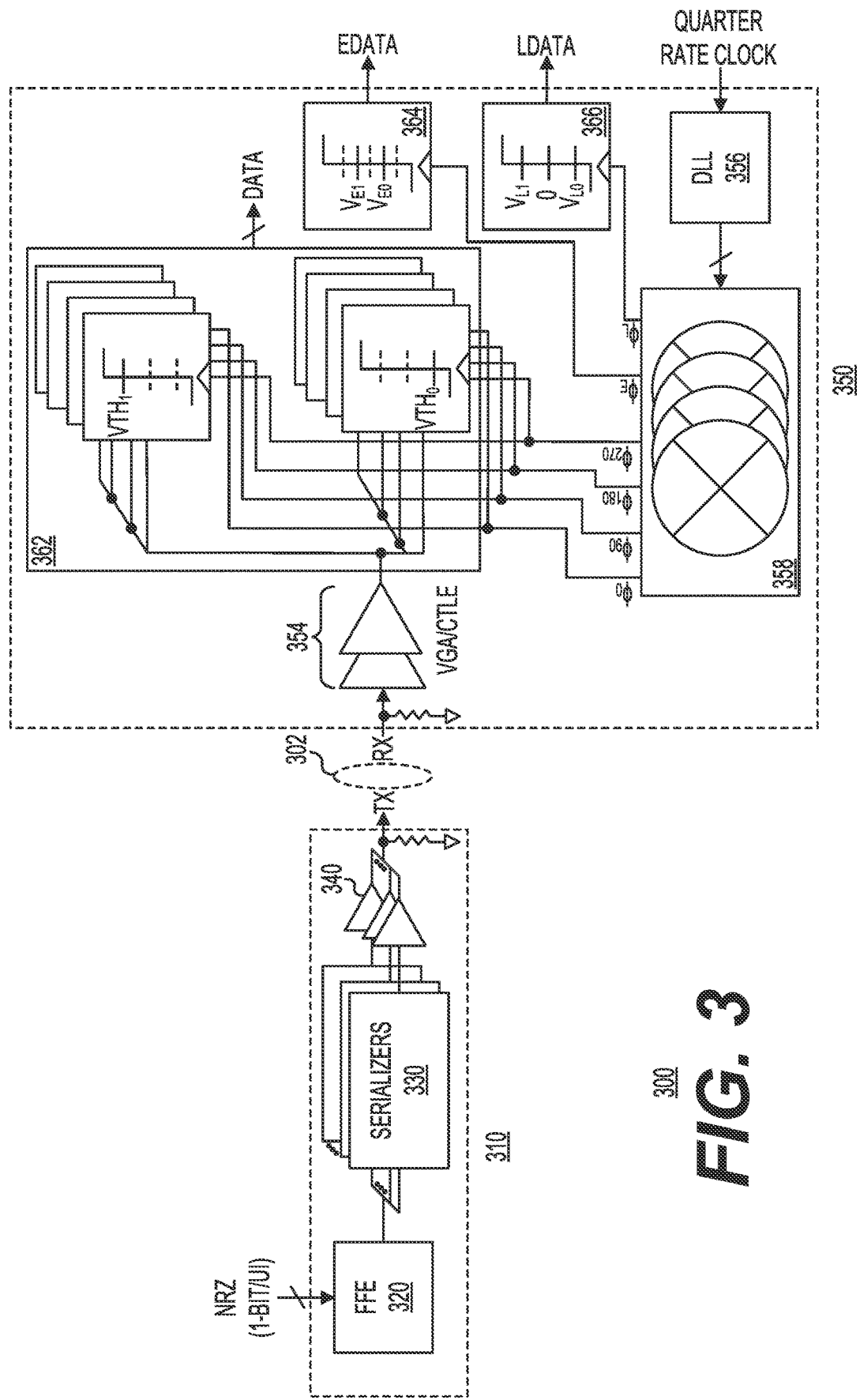
FIG. 3 is a block diagram of a duo-binary transceiver with adaptive channel equalization.

FIG. 3 is a block diagram of a duo-binary transceiver 300 with components for recovering data, error data, and level data for use with the adaptive channel equalization algorithm. Duo-binary transceiver 300 is shown with certain sub-components for a transmitter portion 310 and receiver portion 350 that are most relevant to further explaining the adaptive channel equalization algorithm. Transmitter portion 310 includes components associated with transmitter 210 of FIG. 2 and receiver portion 350 includes components associated with receiver 250 of FIG. 2. The two portions are coupled via channel 302. Transmitter portion 310 includes FFE 320, serializers 330, and drivers 340. As explained before with respect to FFE 220 of FIG. 2, FFE 320 includes circuitry to apply tap coefficients in order to convert the non-return to zero (NRZ) (1-bit/UI) data into duo-binary data. The N streams of data are serialized using serializers 330 and are transmitted after processing by drivers 340.

With continued reference to FIG. 3, after the transmitted signals are received by receiver portion 350, after processing described with respect to FIG. 2, the received signals are processed by VGA/CTLE 354 that has similar functionality as described with respect to CTLE & VGA 254 of FIG. 2. The output of VGA/CTLE 354 is provided to data slicers, which are structured such that one set of slicers compare an upper eye of the duo-binary signals with one threshold voltage (e.g., $VTH_1$) and another set of slicers compare a lower eye of the duo-binary signals with another threshold voltage (e.g., $VTH_0$). As shown in FIG. 3, a quarter rate clock is converted into a four-phase clock ($\phi_0$, $\phi_{90}$, $\phi_{180}$, and $\phi_{270}$) being output by a clock distribution block 358) by a delay-locked loop (DLL) 356. The data slicers are clocked using different phases of quarter clock signals. Further details regarding the processing of the duo-binary signals by data slicers are provided with respect to FIG. 4. Clock distribution block 358 is further configured to provide a clock signal ($\phi_E$) to an edge slicer 364 and another clock signal ($\phi_L$) to an error slicer 366. Although FIG. 3 shows duo-binary transceiver 300 as including a certain number of components arranged in a certain manner, duo-binary transceiver 300 may include additional or fewer components arranged differently.

Figure 4:
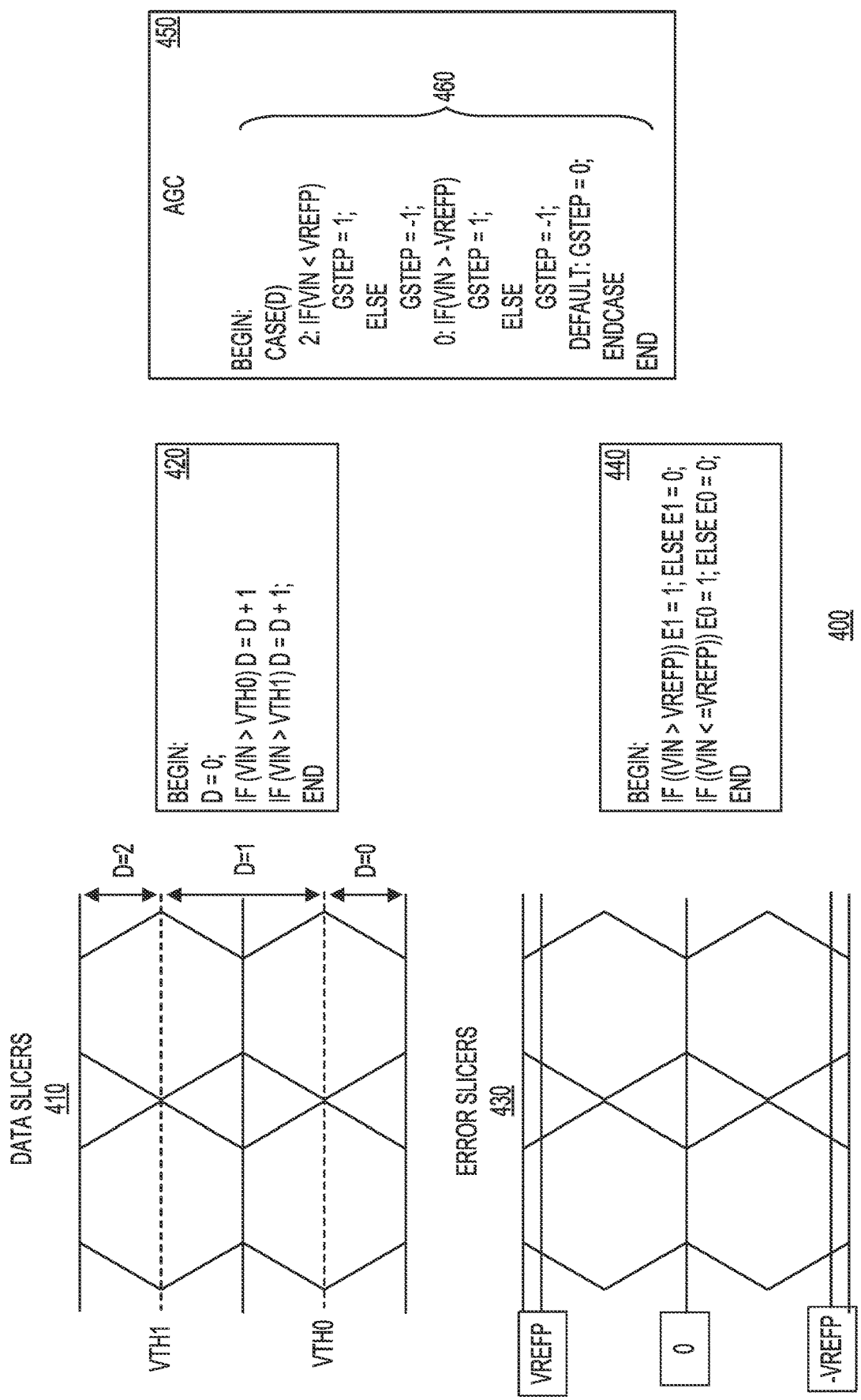
FIG. 4 shows example code for the data slicers, the error slicers, and the automatic gain controller (AGC) associated with the duo-binary transceiver of FIG. 3.

FIG. 4 shows example code for the data slicers, the error slicers, and the automatic gain controller (AGC) associated with the duo-binary transceiver 300 of FIG. 3. As explained earlier, the data signal is located among the three levels associated with the tri-level duo-binary signal. Data slicers 410, which implement the functionality corresponding to code 420, are shown at the top left side of FIG. 4. Error slicers 430, which implement the functionality corresponding to code 440, are shown at the bottom left side of FIG. 4. Example code 460 for automatic gain controller (AGC) 450 is shown at the right side of FIG. 4. Data slicers 410 process the upper eye and/or the lower eye by comparing the received levels with voltage thresholds (e.g., $VTH_1$ and $VTH_0$) shown in FIG. 4. The comparison of the received signal with the voltage threshold $VTH_1$ results in the data (D) having a value of 1 or 2. The comparison of the received signal with the voltage threshold $VTH_0$ results in the data (D) having a value of 1 or 0. Code 420 can be implemented using suitable hardware to implement this functionality.

With continued reference to FIG. 4, error slicers 430 process the upper eye and/or the lower eye by comparing the received levels with reference voltages (e.g., VREFP and −VREFP) shown in FIG. 4. The comparison of the received signal with these reference voltages is effectively a comparison between the peaks of the eye in each direction to determine the extent of the signal that is crossing a positive maximum (e.g., VREFP) and a negative maximum (e.g., −VREFP). The comparison of the received signal with the positive VREFP voltage results in the value of error (E1) for the upper eye having a value of 1 or 0. The comparison of the received signal with the negative VREFP voltage results in the value of error (E0) for the bottom eye having a value of 1 or 0. Verilog code 440 can be implemented using suitable hardware to implement this functionality.

Still referring to FIG. 4, the amount of increase or decrease in the gain per step (gstep) value for the automatic gain controller (AGC) 450 (calculated using the hardware implementation of Verilog code 460) is used to determine an updated value of the gain for the VGA using the following equation: VGAGAIN(n)=VGAGAIN (n−1)+X gstep. Although FIG. 4 shows data slicers 410 and error slicers 430 processing both the upper eye and the lower eye of the duo-binary signal, both eyes need not be processed for the duo-binary adaptive equalization. Instead, only the upper eye or the lower eye may be processed. This may allow for an implementation that includes slicers for processing only the upper eye or the lower eye, resulting in savings of both area and power.

Figure 5:
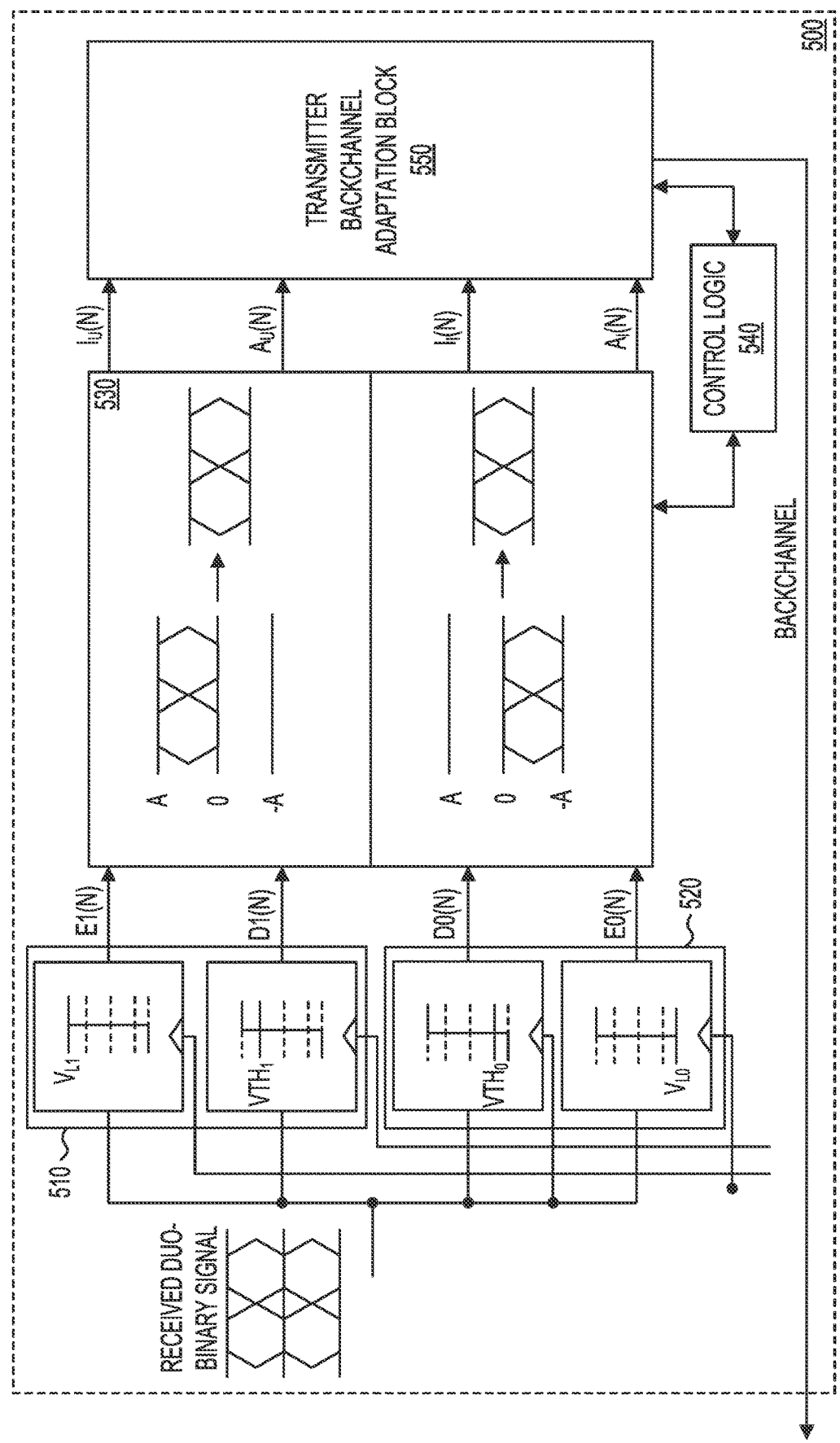
FIG. 5 shows adaptive equalization by processing non-return to zero (NRZ) data selectively derived from an upper eye or a lower eye of the duo-binary signal.

FIG. 5 shows a duo-binary adaptive equalization block 500 of a duo-binary transceiver that is configured to selectively process the non-return to zero (NRZ) data derived from an upper eye or a lower eye of the duo-binary signal. Duo-binary adaptive equalization block 500 includes processing the received duo-binary signal using data slicers 510 and error slicers 520, which are used to analyze the upper eye and the lower eye. Duo-binary adaptive equalization block 500 further includes a duo-binary signal to NRZ signal mapper 530, control logic 540, and transmitter backchannel adaptation block 550. Data slicers 510 and error slicers 520 perform similar functionality as described earlier with respect to FIG. 4. For each time instance, N, data signals (D1(N)) for the upper eye and the data signals (DO(N)) for the lower eye are output by the data slicers. These data signals are then provided to the "duo-binary signal to NRZ signal mapper" 530. Similarly, for each time instance, N, error signals (E1(N)) for the upper eye and the error signals (E0(N)) for the lower eye are output by the error slicers. These error signals are then provided to the "duo-binary signal to NRZ signal mapper" 530. These data signals and the error signals are obtained as part of the processing of the duo-binary signals received by the duo-binary transceiver and need not be generated again for the duo-binary adaptive equalization block 500.

With continued reference to FIG. 5, the upper eye and/or the lower eye of the duo-binary signal (having levels A, 0, and −A in this example) is mapped to respective NRZ signals using duo-binary signal to NRZ signal mapper 530. Table 1 below shows example equations used for mapping the upper eye of the duo-binary signal to the NRZ signal. Similar equations implemented via hardware can be used to map the lower eye of the duo-binary signal to the corresponding NRZ signal.

TABLE 1

$$d(n) \in [0,1,2]$$
$$I_u(n) = \begin{bmatrix} 0 & d(n) == 0 \\ -1 & d(n) == 1 \\ 1 & d(n) == 2 \end{bmatrix}$$
$$A_u(n) = \begin{bmatrix} 1 & e_1(n) == 1 \\ -1 & e_1(n) == 0 \end{bmatrix}$$

Control logic 540 includes registers, finite state machines, and/or other logic to allow control of the duo-binary signal to NRZ signal mapper 530 such that at a time selectively only either the upper eye or the lower eye is analyzed by the duo-binary signal to NRZ signal mapper 530. Table 2 below shows example equations for equalizing the upper eye of the duo-binary signal. Similar equations implemented via hardware can be used to equalize the lower eye of the duo-binary signal. In Table 2, the value for $EQ_k(n)$ corresponds to the equalization value for the kth tap. Similarly, the value for $C_k(n)$ corresponds to the coefficient for the kth tap and the nth time instance. The constant $P_k$ controls the step size of the adaptation performed by transmitter backchannel adaptation block 550. The value of this constant is programmable such that initially it may have a larger value, which is lowered over time to perform adaptation using finer steps.

TABLE 2

$$EQ_k(n) = (I_u(n) == 1)A_u(n) I_u (n - k)$$
$$C_k(n) = C_k(n - 1) + \mu_k EQ_k(n) \forall \ k \neq 0$$

$$C_0(n) = 1 - \sum_{k \neq 0} |C_k(n)|$$

In the above example, the equation for $EQ_k(n)$ correlates the level information for the upper eye $A_u(n)$ with the pre-cursor or the post-cursor information represented by $I_u(n-k)$. In an ideal scenario, the level information for the eye should be uncorrelated with the pre-cursor and the post-cursor, such that the current data value is uncorrelated with the previously processed data and the data to be processed in the future. However, if the duo-binary signal is consistently outputting values that are correlated with either the pre-cursor or the post-cursor, then the channel requires equalization.

Still referring to FIG. 5, in this example, the EQ adaptation as part of transmitter backchannel adaptation block 550 is performed using the sign-sign least-mean-square (SS-LMS) algorithm. The SS-LMS algorithm can be used because the level information has been quantized into two values-one or zero-which further gets mapped to a plus one or a minus one value. Thus, the absolute magnitude of the quantized data is not important, and the SS-LMS algorithm is concerned only with the sign of the level. Advantageously, this selective mapping and analysis saves power since only one of the two eyes is being analyzed at a given moment. In addition, the use of digital circuitry for mapping and analysis, instead of analog circuitry, saves additional power. Although the EQ adaptation algorithm is described as the SS-LMS algorithm, other algorithms, such as sign-magnitude LMS algorithms could also be used.

With respect to the operations associated with the coefficient generation, represented by the equations for $C_k(n)$ and $C_0(n)$ shown in Table 2, these calculations are performed on a decimated basis. As described earlier with respect to FIG. 2B and FIG. 3, de-serializer 256 of FIG. 2B converts the received signal into four streams that are processed by different slicers that receive one of the four phases of clock generated in response to the quarter-rate clock signal shown in FIG. 3. The coefficients are generated using information from a pattern of 16-bit packet of data or a 32-bit packet of data. This allows for a majority-minority type of equalization decision by counting or otherwise accumulating information corresponding to the pattern being analyzed.

The transmitter FFE is trained using the equations shown below in Table 3.

TABLE 3

$EQ_k(n) = (I_k(n) \oplus A_j(n)) \wedge I_j(n)$
$C_k(n) = C_k(n-1) + \mu_k\, EQ_k(n)$ The equation $EQ_k(n)$ performs a similar function as described earlier with respect to Table 2. Table 4 below shows example values for the level information ($A_1$), the data information ($I_j$ and $I_k$), and the equalization values generated by the equation $EQ_k(n)$. The level information ($A_1$) corresponds to the information generated by the error slicers described earlier and the data information ($I_j$ and $I_k$) corresponds to the information generated by the data slicers. Thus, in this example, the level information ($A_1$) indicates whether the peak associated with the received duo-binary signal has a larger value than the reference voltage (e.g., VREFP). Moreover, in this example, the data information ($I_j$ and $I_k$) indicates a comparison of the received duo-binary signal with the voltage threshold(s) described with respect to the data slicers.

TABLE 4

| Example | $I_k$ | $I_j$ | $A_j$ | EQ |
|---|---|---|---|---|
| 1. | 0 | 0 | 0 | 0 |
| 2. | 0 | 0 | 1 | 0 |
| 3. | 0 | 1 | 0 | 1 |
| 4. | 0 | 1 | 1 | −1 |

TABLE 4-continued

| Example | $I_k$ | $I_j$ | $A_j$ | EQ |
|---|---|---|---|---|
| 5. | 1 | 0 | 0 | 0 |
| 6. | 1 | 0 | 1 | 0 |
| 7. | 1 | 1 | 0 | −1 |
| 8. | 1 | 1 | 1 | 1 |

Figure 6:
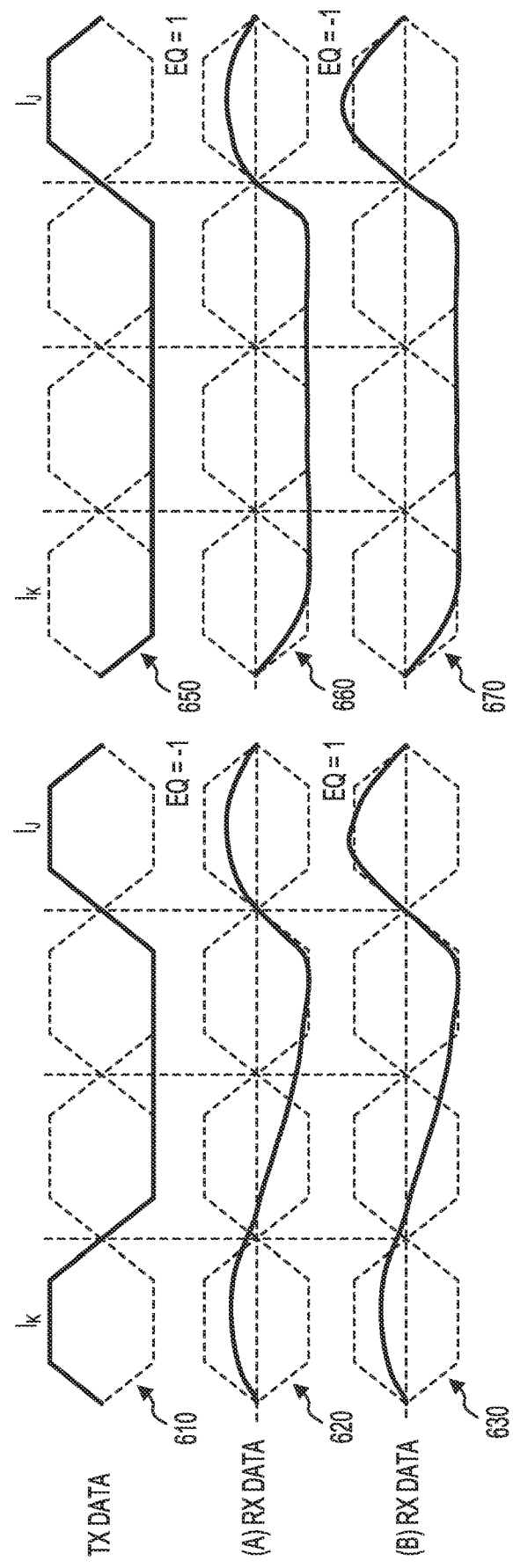
FIG. 6 shows example waveforms of the transmitted data and the received data.

FIG. 6 shows example waveforms 600 of the transmitted data and the received data for two examples from Table 4. Waveform 610 corresponds to transmitted data with the value of 1 for $I_k$ and the value of 1 for $I_j$. Waveform 650 corresponds to transmitted data with the value of 0 for $I_k$ and the value of 1 for $I_j$. Waveforms 620 and 630 are similar in that the received data information is the same as the transmitted data since the data values exceed the mid-threshold value. In the case of waveform 620, however, which corresponds to example 7 from Table 4, the level information ($A_1$) has a value of 0. Thus, in this case, the determined EQ value is −1. In the case of waveform 630, which corresponds to example 8 from Table 4 above, while the values for the received data information are the same as in the case of waveform 620, the level information ($A_j$) has a value of 1. Thus, in this case the determined value of EQ is 1.

With continued reference to FIG. 6, as mentioned above, waveform 650 corresponds to transmitted data with the value of 0 for $I_k$ and the value of 1 for $I_j$. Waveforms 660 and 670 are similar in that the received data information is the same as the transmitted data since the data values exceed the mid-threshold value. In the case of waveform 660, however, which corresponds to example 3 from Table 4, the level information ($A_j$) has a value of 0. Thus, in this case, the determined EQ value is 1. In the case of waveform 670, which corresponds to example 4 from Table 4 above, while the values for the received data information are the same as in the case of waveform 660, the level information ($A_j$) has a value of 1. Thus, in this case the determined value of EQ is −1.

Figure 7:
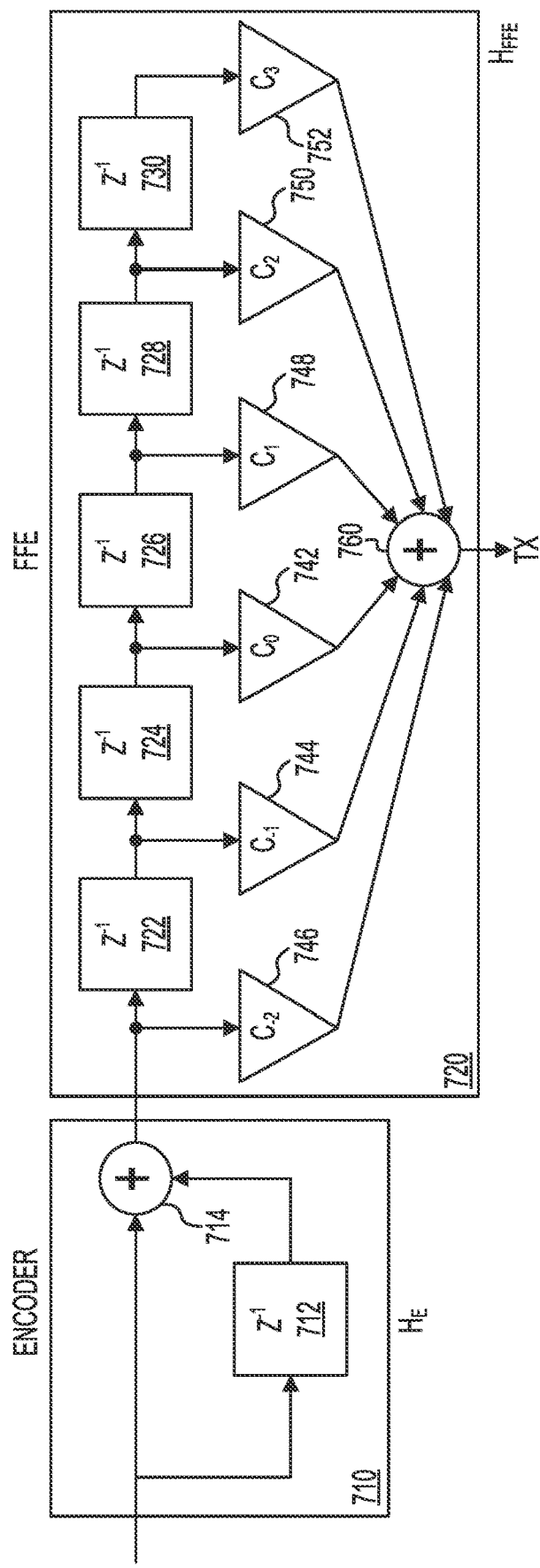
FIG. 7 shows an encoder coupled to an FFE for the transmitter in accordance with one example.

FIG. 7 shows an encoder 710 coupled to an FFE 720 for the transmitter in accordance with one example. In this example, encoder 710 includes a $Z^{-1}$ filter 712 and an adder 714. In this example, the channel impulse response is ($H_E$). FFE 720 includes several $Z^{-1}$ filters (e.g., $Z^{-1}$ filters 722, 724, 726, 728, and 730) each of which add one unit interval (UI) delay to the signal received by the respective filter. Tap coefficients are then applied to the delayed signals before they are added using adder 760. Coefficient $C_0$ 742 corresponds to the main cursor in this example. Coefficient $C_{-1}$ 744 and coefficient $C_{-2}$ 746 correspond to the pre-cursors. Coefficient $C_1$ 748, coefficient $C_2$ 750, and coefficient $C_3$ 752 correspond to the post-cursors.

Figure 8:
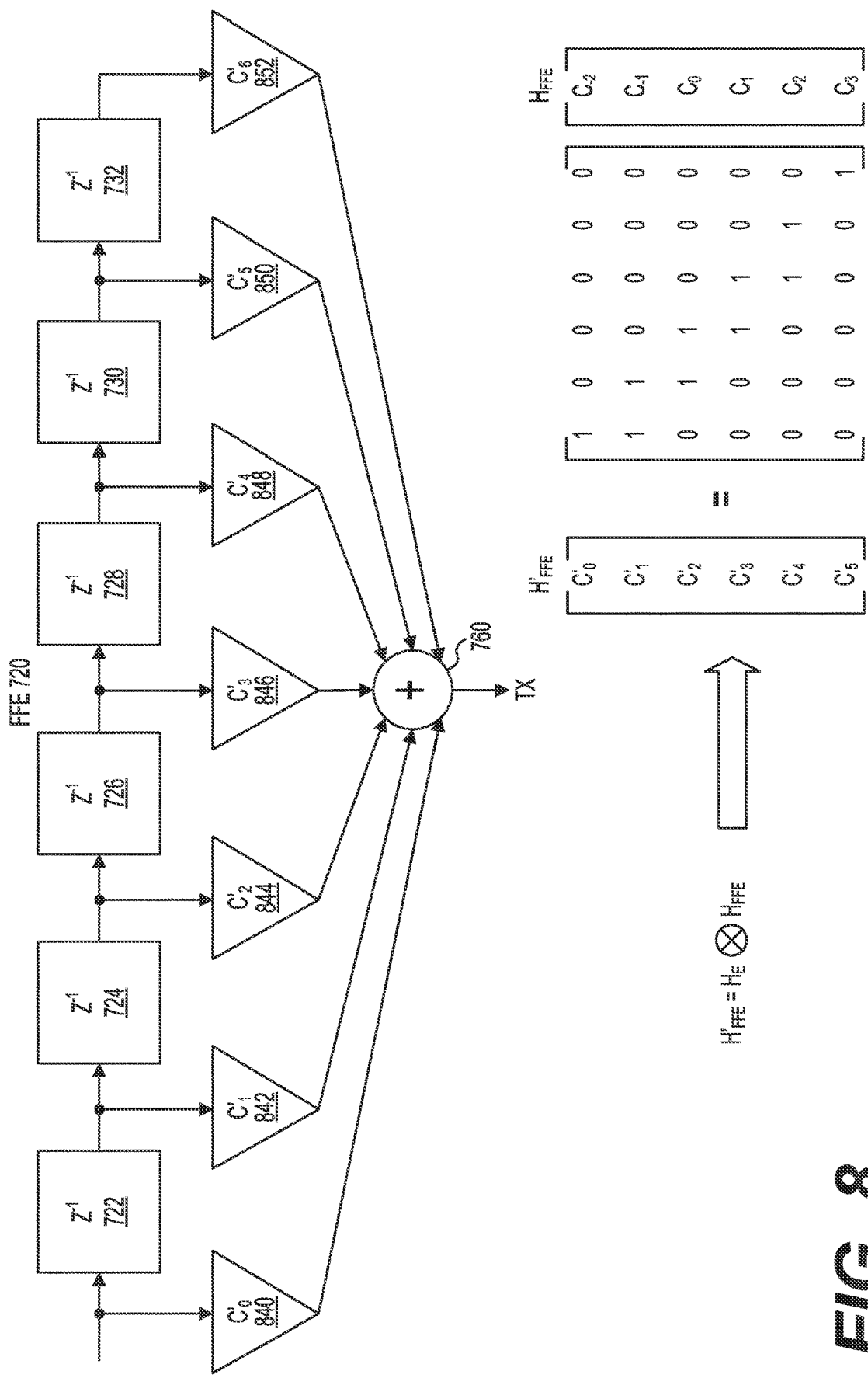
FIG. 8 shows determining updated coefficients for the FFE of FIG. 7 by performing a convolution between the current set of coefficients and the encoder response in accordance with one example.

FIG. 8 shows the determination of the updated coefficients for the FFE 720 of FIG. 7 by performing a convolution between the current set of coefficients and the encoder response in accordance with one example. FFE 720 includes Z−1 filters (e.g., $Z^{-1}$ filters 722, 724, 726, 728, 730, and 732) each of which add one unit interval (UI) delay to the signal received by the respective filter. Tap coefficients (e.g., coefficient $C'_0$ 840, coefficient $C'_1$ 842, coefficient $C'_2$ 844, coefficient $C'_3$ 846, coefficient $C'_4$ 848, coefficient $C'_5$ 850, and coefficient $C'_6$ 852) are then applied to the delayed signals before they are added using adder 760. As shown in FIG. 8, the updated coefficients ($H_{FFE}'$) are determined by performing a convolution between the channel impulse response ($H_E$) with the FFE coefficients ($H_{FFE}$). In sum, as explained earlier, the equalization uses a sign-sign least mean squares (SS-LMS) algorithm to process the level information to extract the correlation between the present data and previous or post data symbols. This correlation guides the change required at transmitter for the pre-cursor coefficients and the post-cursor coefficients. Advantageously, the equalization solution uses the transmitter FFE and the channel ISI together to create a $1+Z^{-1}$ filter response.

Figure 9:
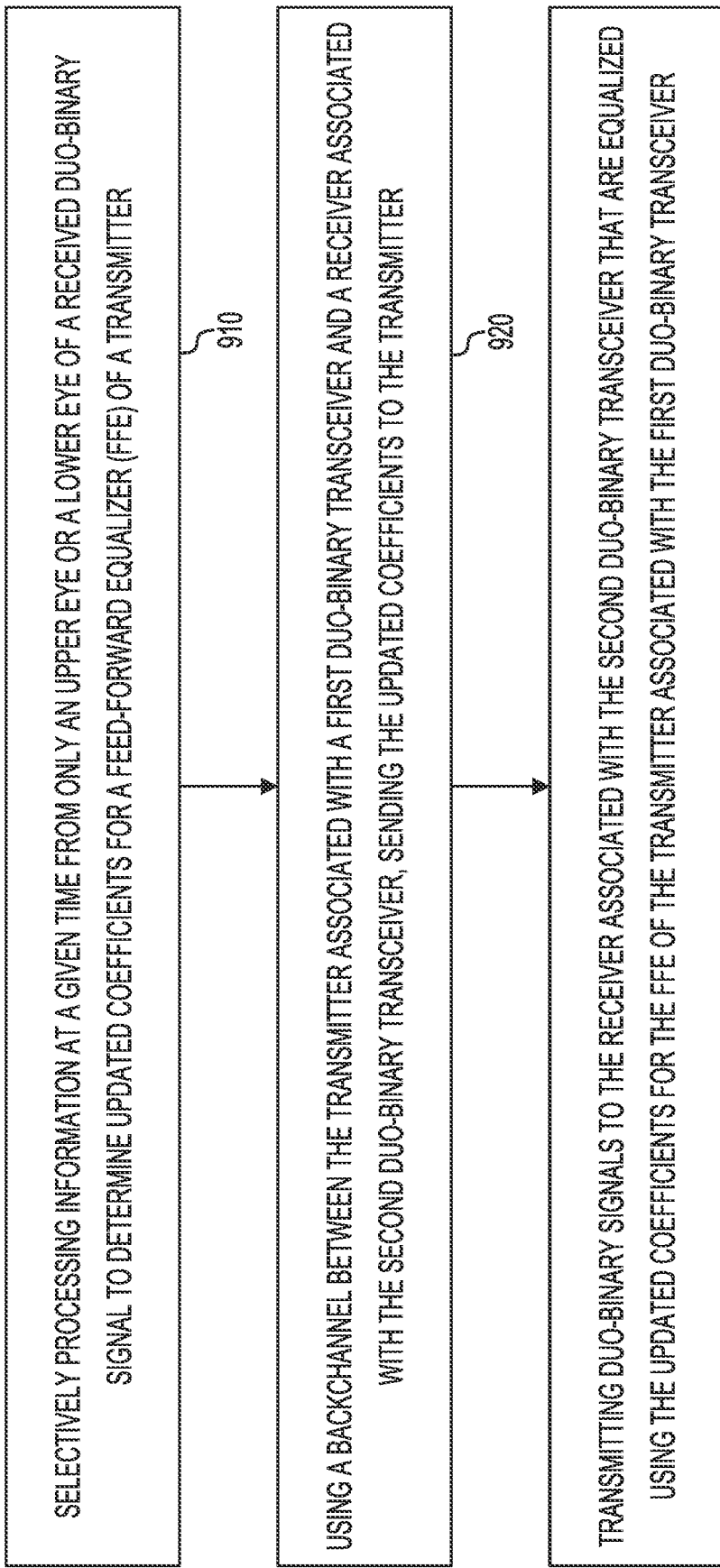
FIG. 9 shows a flow chart of an example method for implementing adaptive channel equalization as part of a duo-binary transceiver.

FIG. 9 shows a flow chart 900 of an example method for implementing adaptive channel equalization as part of a duo-binary transceiver. In one example, this method may be performed using the duo-binary transceivers of system 100 of FIG. 1 and certain components and algorithms as described with respect to FIG. 2A to FIG. 8. Step 910 may include selectively processing information at a given time from only an upper eye or a lower eye of a received duo-binary signal to determine updated coefficients for the FFE of the transmitter. In one example, selectively processing information at the given time from only the upper eye or the lower eye of the received duo-binary signal includes extracting correlation information between a main cursor and a pre-cursor or a post-cursor associated with the received duo-binary signal. As part of this step, as explained earlier with respect to FIGS. 4 and 5, data slicers and error slicers may be used to extract data information (e.g., D0(N) and D1(N) of FIG. 5) and the error information (e.g., E0(N) and E1(N) of FIG. 5). In addition, as part of this step, the level information may be determined by analyzing the NRZ signal associated with the upper eye or the lower eye. As explained earlier, the level information is obtained by mapping the received duo-binary signal to a first non-return to zero (NRZ) signal corresponding to the upper eye of the received duo-binary signal and to a second NRZ signal corresponding to the lower eye. The data information and the level information may further be processed to determine equalization information. The equalization information may further be used for calculating the updated coefficients for the FFE of the transmitter.

The EQ adaptation is performed using the sign-sign least-mean-square (SS-LMS) algorithm. The SS-LMS algorithm can be used because the level information has been quantized into two values-one or zero-which further gets mapped to a plus one or a minus one value. Thus, the absolute magnitude of the quantized data is not important, and the SS-LMS algorithm is concerned only with the sign of the level. Advantageously, this selective mapping and analysis saves power since only one of the two eyes is being analyzed at a given moment. In addition, the use of digital circuitry for mapping and analysis, instead of analog circuitry, saves additional power. Moreover, as explained earlier, calculations for determining the equalization information are performed on a decimated basis. As described earlier with respect to FIG. 2B and FIG. 3, de-serializer 256 of FIG. 2B converts the received signal into four streams that are processed by different slicers that each receive one clock signal out of the four phases of clock signals generated in response to the quarter-rate clock signal shown in FIG. 3. The coefficients are generated using information from a pattern of 16-bit packet of data or a 32-bit packet of data. This allows for a majority-minority type of equalization decision by counting or otherwise accumulating information corresponding to the pattern being analyzed.

With continued reference to FIG. 9, step 920 may include using a backchannel between the transmitter associated with the first duo-binary transceiver and the receiver associated with the second duo-binary transceiver, sending the updated coefficients to the transmitter associated with the first duo-binary transceiver. As part of this step, the backchannel described earlier with respect to FIGS. 1, 2A, 2B, and 5 may be used.

Still referring to FIG. 9, step 930 may include transmitting duo-binary signals to the receiver associated with the second duo-binary transceiver that are equalized using the updated coefficients for the FFE of the transmitter associated with the first duo-binary transceiver. As explained earlier with respect to FIGS. 7 and 8, the transmitter may perform a convolution operation using the updated coefficients received via the backchannel and a channel impulse response of the channel for use with the FFE of the transmitter. Although FIG. 9 shows a certain number of steps performed in a certain order, additional or fewer steps in a different order may be performed as part of the method described with respect to flow chart 900.

FIG. 10 shows a flow chart 1000 of an example method for implementing adaptive channel equalization as part of a duo-binary transceiver. In one example, this method may be performed using the duo-binary transceivers of system 100 of FIG. 1 and certain components and algorithms as described with respect to FIG. 2A to FIG. 8. Step 1010 may include at a receiver associated with the second duo-binary transceiver: (1) selectively processing level information at a given time from only an upper eye or a lower eye of a received duo-binary signal to determine updated coefficients for the FFE of the transmitter, and (2) selectively processing peak information at the given time from only the upper eye or the lower eye of the received duo-binary for automatically controlling the gain of one or more variable gain amplifiers of the receiver.

As part of this step, as explained earlier with respect to FIGS. 4 and 5, data slicers and error slicers may be used to extract data information (e.g., D0(N) and D1(N) of FIG. 5) and the error information (e.g., E0(N) and E1(N) of FIG. 5). Error information may be obtained by comparing the received levels with reference voltages (e.g., VREFP and -VREFP) shown in FIG. 4. The comparison of the received signal with these reference voltages is effectively a comparison between the peaks of the eye in each direction to determine the extent of the signal that is crossing a positive maximum (e.g., VREFP) and a negative maximum (e.g., −VREFP).

In addition, as part of this step, the level information may be determined by analyzing the NRZ signal associated with the upper eye or the lower eye. As explained earlier, the level information is obtained by mapping the received duo-binary signal to a first non-return to zero (NRZ) signal corresponding to the upper eye of the received duo-binary signal and to a second NRZ signal corresponding to the lower eye. The data information and the level information may further be processed to determine equalization information. The equalization information may further be used for calculating the updated coefficients for the FFE of the transmitter.

The EQ adaptation is performed using the sign-sign least-mean-square (SS-LMS) algorithm. The SS-LMS algorithm can be used because the level information has been quantized into two values-one or zero-which further gets mapped to a plus one or a minus one value. Thus, the absolute magnitude of the quantized data is not important, and the SS-LMS algorithm is concerned only with the sign of the level. Advantageously, this selective mapping and analysis saves power since only one of the two eyes is being analyzed at a given moment. In addition, the use of digital circuitry for mapping and analysis, instead of analog circuitry, saves additional power. Moreover, as explained earlier, calculations for determining the equalization information are performed on a decimated basis. As described earlier with respect to FIG. 2B and FIG. 3, de-serializer 256 of FIG. 2B converts the received signal into four streams that are processed by different slicers that each receive one clock signal out of the four phases of clock signals generated in response to the quarter-rate clock signal shown in FIG. 3. The coefficients are generated using information from a pattern of 16-bit packet of data or a 32-bit packet of data. This allows for a majority-minority type of equalization decision by counting or otherwise accumulating information corresponding to the pattern being analyzed.

With continued reference to FIG. 10, step 1020 may include using a backchannel between the transmitter associated with the first duo-binary transceiver and the receiver associated with the second duo-binary transceiver, sending the updated coefficients to the transmitter associated with the first duo-binary transceiver. As part of this step, the backchannel described earlier with respect to FIGS. 1, 2A, 2B, and 5 may be used.

Still referring to FIG. 10, step 1030 may include transmitting duo-binary signals to the receiver associated with the second duo-binary transceiver that are equalized using the updated coefficients for the FFE of the transmitter associated with the first duo-binary transceiver. As explained earlier with respect to FIGS. 7 and 8, the transmitter may perform a convolution operation using the updated coefficients received via the backchannel and a channel impulse response of the channel for use with the FFE of the transmitter. Although FIG. 10 shows a certain number of steps performed in a certain order, additional or fewer steps in a different order may be performed as part of the method described with respect to flow chart 1000.

In conclusion, the present disclosure relates to a a method for adapting a channel between a first duo-binary transceiver and a second duo-binary transceiver, different from the first duo-binary transceiver, where the transmitter includes a feed-forward equalizer (FFE). The method may include at a receiver associated with the second duo-binary transceiver, selectively processing information at a given time from only an upper eye or a lower eye of a received duo-binary signal to determine updated coefficients for the FFE of the transmitter associated with the first duo-binary transceiver.

The method may further include using a backchannel between the transmitter associated with the first duo-binary transceiver and the receiver associated with the second duo-binary transceiver, sending the updated coefficients to the transmitter associated with the first duo-binary transceiver. The method may further include transmitting duo-binary signals to the receiver associated with the second duo-binary transceiver that are equalized using the updated coefficients for the FFE of the transmitter associated with the first duo-binary transceiver.

As part of this method, selectively processing information at the given time from only the upper eye or the lower eye of the received duo-binary signal may comprise extracting correlation information between a main cursor and a pre-cursor or a post-cursor associated with the received duo-binary signal. The method may further include obtaining level information by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

The method may further include determining equalization information based on both the level information from either the upper eye or the lower eye and data information obtained from the received duo-binary signal, and using the equalization information calculating the updated coefficients for the FFE of the transmitter. Determining the equalization information may comprise using a sign-sign least means squares (SS-LMS) algorithm.

As part of the method, selectively processing information at the given time from only the upper eye or the lower eye of the received duo-binary signal may comprise periodically switching between processing information from the upper eye or the lower eye to determine the updated coefficients for the FFE of the transmitter. The method may further include performing a convolution operation using the updated coefficients received via the backchannel and a channel impulse response of the channel for use with the FFE of the transmitter associated with the first duo-binary transceiver.

In another example, the present disclosure relates to a system for adapting a channel between a first duo-binary transceiver and a second duo-binary transceiver, different from the first duo-binary transceiver, where the transmitter includes a feed-forward equalizer (FFE). The system may further include logic to selectively process information at a given time information from only an upper eye or a lower eye of a received duo-binary signal to determine updated coefficients for the FFE of the transmitter associated with the first duo-binary transceiver.

The system may further include a backchannel between the transmitter associated with the first duo-binary transceiver and the receiver associated with the second duo-binary transceiver for sending the updated coefficients to the transmitter associated with the first duo-binary transceiver, such that the transmitter is operable to transmit duo-binary signals, equalized using the updated coefficients for the FFE of the transmitter, to the receiver associated with the second duo-binary transceiver.

The logic to selectively process information at the given time from only the upper eye or the lower eye of the received duo-binary signal may comprise logic to extract correlation information between a main cursor and a pre-cursor or a post-cursor associated with the received duo-binary signal. The level information may be obtained by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

The system may further include logic to determine equalization information based on both the level information from either the upper eye or the lower eye and data information obtained from the received duo-binary signal, and using the equalization information calculating the updated coefficients for the FFE of the transmitter. The logic to determine the equalization information may comprise logic to implement a sign-sign least means squares (SS-LMS) algorithm. The system may further include logic to selectively process peak information at the given time from only the upper eye or the lower eye of the received duo-binary for automatically controlling the gain of one or more variable gain amplifiers of the receiver, In yet another example, the present disclosure relates to a method for adapting a transmitter associated with a first duo-binary transceiver and a channel between the first duo-binary transceiver and a second duo-binary transceiver, different from the first duo-binary transceiver, where the transmitter includes a feed-forward equalizer (FFE). The method may include at a receiver associated with the second duo-binary transceiver: (1) selectively processing level information at a given time from only an upper eye or a lower eye of a received duo-binary signal to determine updated coefficients for the FFE of the transmitter, and (2) selectively processing peak information at the given time from only the upper eye or the lower eye of the received duo-binary for automatically controlling the gain of one or more variable gain amplifiers of the receiver.

The method may further include using a backchannel between the transmitter associated with the first duo-binary transceiver and the receiver associated with the second duo-binary transceiver, sending the updated coefficients to the transmitter associated with the first duo-binary transceiver. The method may further include transmitting duo-binary signals to the receiver associated with the second duo-binary transceiver that are equalized using the updated coefficients for the FFE of the transmitter associated with the first duo-binary transceiver.

As part of the method, selectively processing information at the given time from only the upper eye or the lower eye of the received duo-binary signal to determine updated coefficients for the FFE of the transmitter may comprise extracting correlation information between a main cursor and a pre-cursor or a post-cursor associated with the received duo-binary signal. The method may further include obtaining level information by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

The method may further include determining equalization information based on both the level information from either the upper eye or the lower eye and data information obtained from the received duo-binary signal, and using the equalization information calculating the updated coefficients for the FFE of the transmitter. Determining the equalization information may comprise using a sign-sign least means squares (SS-LMS) algorithm.

The method may further include processing edge information from only the upper eye or the lower eye for use with a clock data recovery (CDR) circuit of the receiver associated with the second duo-binary transceiver. Selectively processing information at the given time from only the upper eye or the lower eye of the received duo-binary signal to determine updated coefficients for the FFE of the transmitter may comprise periodically switching between processing information from the upper eye or the lower eye to determine the updated coefficients for the FFE of the transmitter.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for adapting a channel between a first duo-binary transceiver and a second duo-binary transceiver, different from the first duo-binary transceiver, the method comprising:

at a receiver associated with the second duo-binary transceiver, selectively processing information at a given time from only an upper eye or a lower eye of a received duo-binary signal to determine updated coefficients for a feed-forward equalizer (FFE) of a transmitter associated with the first duo-binary transceiver; and using a backchannel between the transmitter associated with the first duo-binary transceiver and the receiver associated with the second duo-binary transceiver, sending the updated coefficients to the transmitter associated with the first duo-binary transceiver.

2. The method of claim 1, further comprising transmitting duo-binary signals to the receiver associated with the second duo-binary transceiver that are equalized using the updated coefficients for the FFE of the transmitter associated with the first duo-binary transceiver.

3. The method of claim 2, further comprising performing a convolution operation using the updated coefficients received via the backchannel and a response of the transmitter for use with the FFE of the transmitter associated with the first duo-binary transceiver.

4. The method of claim 1, wherein the selectively processing information at the given time from only the upper eye or the lower eye of the received duo-binary signal comprises extracting correlation information between a main cursor and a pre-cursor or a post-cursor associated with the received duo-binary signal.

5. The method of claim 1, further comprising obtaining level information by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

6. The method of claim 5, further comprising determining equalization information based on both the level information from either the upper eye or the lower eye and data information obtained from the received duo-binary signal, and using the equalization information calculating the updated coefficients for the FFE of the transmitter.

7. The method of claim 6, wherein determining the equalization information comprises using a sign-sign least means squares (SS-LMS) algorithm.

8. The method of claim 1, wherein the selectively processing information at the given time from only the upper eye or the lower eye of the received duo-binary signal comprises periodically switching between processing information from the upper eye or the lower eye to determine the updated coefficients for the FFE of the transmitter.

9. A system for adapting a channel between a first duo-binary transceiver and a second duo-binary transceiver, different from the first duo-binary transceiver, the system comprising:
   logic to selectively process information at a given time information from only an upper eye or a lower eye of a received duo-binary signal to determine updated coefficients for a feed-forward equalizer (FFE) of a transmitter associated with the first duo-binary transceiver; and
   a backchannel between the transmitter associated with the first duo-binary transceiver and a receiver associated with the second duo-binary transceiver for sending the updated coefficients to the transmitter associated with the first duo-binary transceiver.

10. The system of claim 9, wherein the transmitter is operable to transmit duo-binary signals, equalized using the updated coefficients for the FFE of the transmitter, to the receiver associated with the second duo-binary transceiver.

11. The system of claim 9, wherein the logic to selectively process information at the given time from only the upper eye or the lower eye of the received duo-binary signal comprises logic to extract correlation information between a main cursor and a pre-cursor or a post-cursor associated with the received duo-binary signal.

12. The system of claim 9, wherein the level information is obtained by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

13. The system of claim 12, further comprising logic to determine equalization information based on both the level information from either the upper eye or the lower eye and data information obtained from the received duo-binary signal, and using the equalization information calculating the updated coefficients for the FFE of the transmitter.

14. The system of claim 9, wherein the logic to determine the equalization information comprises logic to implement a sign-sign least means squares (SS-LMS) algorithm.

15. The system of claim 9, further comprising logic to selectively process peak information at the given time from only the upper eye or the lower eye of the received duo-binary for automatically controlling the gain of one or more variable gain amplifiers of the receiver.

16. A method for adapting a channel between a first duo-binary transceiver and a second duo-binary transceiver, different from the first duo-binary transceiver, wherein a transmitter includes a feed-forward equalizer (FFE), the method comprising:
   at a receiver associated with the second duo-binary transceiver: (1) selectively processing level information at a given time from only an upper eye or a lower eye of a received duo-binary signal to determine updated coefficients for the FFE of the transmitter of the first duo-binary transceiver, and (2) selectively processing peak information at the given time from only the upper eye or the lower eye of the received duo-binary for automatically controlling the gain of one or more variable gain amplifiers of the receiver;
   using a backchannel between the transmitter associated with the first duo-binary transceiver and the receiver associated with the second duo-binary transceiver, sending the updated coefficients to the transmitter associated with the first duo-binary transceiver; and
   transmitting duo-binary signals to the receiver associated with the second duo-binary transceiver that are equalized using the updated coefficients for the FFE of the transmitter associated with the first duo-binary transceiver.

17. The method of claim 16, wherein the selectively processing information at the given time from only the upper eye or the lower eye of the received duo-binary signal to determine updated coefficients for the FFE of the transmitter comprises extracting correlation information between a main cursor and a pre-cursor or a post-cursor associated with the received duo-binary signal.

18. The method of claim 16, further comprising obtaining level information by mapping the received duo-binary signal to a first non-return to zero (NRZ) signal corresponding to the upper eye of the received duo-binary signal or mapping the received duo-binary signal to a second NRZ signal corresponding to the lower eye of the received duo-binary signal.

19. The method of claim 18, further comprising determining equalization information based on both the level information from either the upper eye or the lower eye and data information obtained from the received duo-binary signal, and using the equalization information calculating the updated coefficients for the FFE of the transmitter.

20. The method of claim 19, wherein determining the equalization information comprises using a sign-sign least means squares (SS-LMS) algorithm.

21. The method of claim 16, further comprising processing edge information from only the upper eye or the lower eye for use with a clock data recovery (CDR) circuit of the receiver associated with the second duo-binary transceiver.

22. The method of claim 16, wherein the selectively processing information at the given time from only the upper eye or the lower eye of the received duo-binary signal to determine updated coefficients for the FFE of the transmitter comprises periodically switching between processing information from the upper eye or the lower eye to determine the updated coefficients for the FFE of the transmitter.

\* \* \* \* \*